(12) United States Patent
Lejon et al.

(10) Patent No.: US 9,951,886 B2
(45) Date of Patent: Apr. 24, 2018

(54) ARRANGEMENT SYSTEM AND METHOD FOR RETRIEVING A LAYDOWN HEAD

(71) Applicant: VETCO GRAY SCANDINAVIA AS, Sandvika (NO)

(72) Inventors: Curt Lejon, Trondheim (NO); Halvard Eneberg, Trondheim (NO)

( * ) Notice: Subject to any disclaimer, the term of this patent is extended or adjusted under 35 U.S.C. 154(b) by 70 days.

(21) Appl. No.: 14/897,548

(22) PCT Filed: Jun. 10, 2014

(86) PCT No.: PCT/IB2014/001007
§ 371 (c)(1),
(2) Date: Dec. 10, 2015

(87) PCT Pub. No.: WO2014/199213
PCT Pub. Date: Dec. 18, 2014

(65) Prior Publication Data
US 2016/0116081 A1    Apr. 28, 2016

(30) Foreign Application Priority Data

Jun. 10, 2013 (NO) .................................. 20130813

(51) Int. Cl.
*F16L 1/26* (2006.01)
*F16L 1/16* (2006.01)
(Continued)

(52) U.S. Cl.
CPC .............. *F16L 1/166* (2013.01); *B63B 27/30* (2013.01); *E21B 43/013* (2013.01); *F16L 1/26* (2013.01)

(58) Field of Classification Search
CPC .................................... F16L 1/166; F16L 1/26
(Continued)

(56) References Cited

U.S. PATENT DOCUMENTS 4,051,688 A * 10/1977 Ells ........................... F16L 1/26
228/212
5,921,713 A * 7/1999 Gjessing ................. E21B 41/04
405/158
(Continued)

FOREIGN PATENT DOCUMENTS

| EP | 2547940 A1 | 1/2013 |
| GB | 2307288 A | 5/1997 |
| WO | WO 2011114172 A1 * | 9/2011 |

OTHER PUBLICATIONS

Unofficial English Translation of Norway Office Action issued in connection with corresponding NO Application No. 20130813 dated Nov. 19, 2013.
(Continued)

*Primary Examiner* — Sunil Singh
(74) *Attorney, Agent, or Firm* — GE Global Patent Operation

(57) ABSTRACT

An arrangement for retrieving a laydown head to a surface vessel from a pipeline end section that is secured to a pipeline termination skid at the seabed. The arrangement is detachably mountable to the pipeline termination skid and comprises a base frame configured to bear against the pipeline termination skid when the arrangement is mounted to the pipeline termination skid; and one or more rigid supporting units provided on the base frame for supporting the laydown head from below, each supporting unit comprising an upwardly directed seat for receiving the laydown head and an actuating device for moving the seat in the vertical direction. Embodiments of the present invention also relate to a system comprising such an arrangement and a pipeline termination skid, and a method for retrieving a laydown head by means of such an arrangement.

19 Claims, 4 Drawing Sheets

(51) Int. Cl.
*E21B 43/013* (2006.01)
*B63B 27/30* (2006.01)

(58) Field of Classification Search
USPC ......... 405/158, 169, 170, 184.4; 114/50, 51, 114/293
See application file for complete search history.

(56) References Cited

U.S. PATENT DOCUMENTS

| | | |
|---|---|---|
| 2003/0049076 A1 | 3/2003 | Bekkevold et al. |
| 2007/0009328 A1 | 1/2007 | Bastesen et al. |
| 2007/0269270 A1 | 11/2007 | Bastesen et al. |
| 2009/0297274 A1 | 12/2009 | Cafaro et al. |
| 2010/0021238 A1 | 1/2010 | Mogedal et al. |
| 2012/0199358 A1 | 8/2012 | Larsson |
| 2012/0201607 A1 | 8/2012 | Larsson et al. |
| 2012/0263541 A1 | 10/2012 | Lillejordet et al. |

OTHER PUBLICATIONS

PCT Search Report and Written Opinion issued in connection with corresponding Application No. PCT/IB2014/001007 dated Sep. 12, 2014.

European Search Report and Opinion issued in connection with corresponding EP Application No. 14811610.6 dated Dec. 20, 2016.

\* cited by examiner

ARRANGEMENT SYSTEM AND METHOD FOR RETRIEVING A LAYDOWN HEAD

BACKGROUND OF THE INVENTION

Embodiments of the present invention relate to an arrangement to be used for retrieving a laydown head to a surface vessel from a pipeline end section that is secured to a pipeline termination skid at the seabed. The invention also relates to a system comprising such an arrangement and a method for retrieving a laydown head to a surface vessel from a pipeline end section that is secured to a pipeline termination skid at the seabed.

Development within offshore oil and gas exploration in the recent years has been directed to subsea installations for processing and transport of oil and gas. These subsea installations replace the traditional platforms, where oil and gas are transported up to the platform for further processing and transport. This development of subsea production, processing and transport systems has resulted in an increasing need for subsea connection arrangements for coupling together a longer pipeline installed on the seabed and a so-called "spool piece" without requiring any assistance of divers. A spool piece is used for connecting a pipeline termination to a pipe termination of a subsea installation, such as e.g. a subsea production manifold. The spool piece is designed to span between the end points of the pipeline termination and the pipe termination in order to complete a connection between the pipeline and the pipe. The spool piece is provided with a spool piece hub which shall mate with a corresponding pipeline hub arranged at the pipeline termination.

A pipeline termination skid to be mounted to a pipeline end section in order to support a pipeline hub of the pipeline end section during and after the connection of the pipeline hub to a corresponding spool piece hub is previously known from WO 2006/005994 A1. This known pipeline termination skid is so designed that a pipeline end section may be mounted thereto subsea by lowering the pipeline end section into a seat of one or more holding units of the pipeline termination skid and thereafter displacing the pipeline termination skid along the pipeline end section so that the respective seat is brought into engagement with an alignment element secured about the pipeline end section so as to thereby fix the pipeline end section axially and radially in relation to the pipeline termination skid. When the pipeline end section has been secured to the pipeline termination skid, a spool piece termination structure carrying the spool piece hub and a clamping device is connectable to the pipeline termination skid by being lowered into engagement therewith. After the landing of the spool piece termination structure on the pipeline termination skid, the actual connection of the pipeline hub to the spool piece hub may be performed by displacing the clamping device and the spool piece hub in relation to the pipeline termination skid and the pipeline hub so as to bring the pipeline hub and the spool piece hub into contact with each other, whereupon the clamping device is activated so as to clamp together the pipeline hub and the spool piece hub. When a pipeline termination skid of this type is used, the entire pipeline may be laid on the seabed before the pipeline end section is secured to the pipeline termination skid.

Before and during the connection of the pipeline end section to the pipeline termination skid, a tubular member in the form of a so-called laydown head is secured to the pipeline hub of the pipeline end section. The laydown head extends in line with the pipeline end section and may be provided with valves to make the laydown head capable of functioning as a pig launcher. As an alternative, the laydown head may lack such valves. During the connection of the pipeline end section to the pipeline termination skid, the pipeline end section may be lifted by means of wires fixed to the laydown head. When the pipeline end section has been secured to the pipeline termination skid, the laydown head is disconnected from the pipeline end section and retrieved to a surface vessel. A retrieval of a laydown head from a pipeline termination skid of the type disclosed in WO 2006/005994 A1 is normally accomplished be means of a lifting frame, which is lowered downwards onto the pipeline termination skid so as to bring the lifting frame to bear against the pipeline termination skid with a horizontal girder of the lifting frame positioned vertically above the laydown head, a number of chains being fixed to the girder at different positions along the length thereof. Thereafter, the lower end of each chain is fixed to the laydown head and the chains are stretched by means of ROV operated (ROV=Remotely Operated Vehicle) chain hoists, whereupon the laydown head is disconnected from the pipeline end section so as to become suspended by the girder through the chains. The lifting frame is then, by means of lifting wires, lifted upwards to a surface vessel with the laydown head hanging below the girder of the lifting frame through the chains. The retrieval of a laydown head by means of such a lifting frame is a rather complicated and time-consuming operation.

SUMMARY OF THE INVENTION

The object of embodiments of the present invention is to make possible a simple and safe retrieval of a laydown head from a pipeline end section that is secured to a pipeline termination skid at the seabed.

According to embodiments of the invention, this object is achieved by an arrangement that is detachably mountable to a pipeline termination skid and comprises: a base frame configured to bear against the pipeline termination skid when the arrangement is mounted to the pipeline termination skid; and one or more rigid supporting units provided on the base frame for supporting the laydown head from below, each supporting unit comprising at least one upwardly directed seat for receiving the laydown head and an actuating device, by means of which the at least one seat is moveable in relation to the base frame in the vertical direction.

The arrangement is to be mounted to the pipeline termination skid in such a position that a laydown head fixed to a hub at the end of a pipeline end section will be positioned vertically above the seat of each supporting unit when the pipeline end section has been secured to the pipeline termination skid. The seat of each supporting unit may then be pressed upwards against the laydown head by means of the actuating device of the supporting unit so as to allow the laydown head to be supported by the base frame through the supporting unit or supporting units. When the laydown head thereafter is released from the pipeline end section, the laydown head will consequently rest on the seat of each supporting unit in a controlled manner, whereupon the laydown head may be retrieved to a surface vessel together with the arrangement after the detachment of the arrangement from the pipeline termination skid. Thus, a laydown head may be retrieved to a surface vessel in a simple, rapid and safe manner by means of the arrangement of embodiments of the present invention. The arrangement does not interfere with the operations of securing the pipeline end section to the pipeline termination skid and the arrangement may consequently be mounted to the pipeline termination skid before the pipeline termination skid is lowered into the sea. Thus, no time-consuming subsea mounting of the arrangement to the pipeline termination skid is required.

In an embodiment, the actuating device may be a hydraulic cylinder or a mechanically actuated drive screw mechanism. Hereby, the vertical position of the seat or seats of each supporting unit may be controlled in a simple and reliable manner.

According to an embodiment of the invention, the arrangement comprises a locking device for securing the laydown head to the arrangement in a fixed position when the seat or seats of each supporting unit is in contact with the laydown head. By means of this locking device, the laydown head may be secured in a correct position on the supporting units and prevented from moving in relation to the supporting units and the base frame.

According to another embodiment of the invention, the arrangement comprises a locking device provided on the base frame for securing the base frame to the pipeline termination skid, this locking device comprising at least one locking member which is moveably mounted to the base frame so as to be moveable between a locking position, in which the base frame is secured to the pipeline termination skid in a fixed position, and an unlocking position, in which the base frame is longitudinally slidable in relation to the pipeline termination skid and vertically liftable away from the pipeline termination skid. By means of this locking device, the arrangement may be secured to the pipeline termination skid in a fixed position so as to allow the arrangement to be lowered into the sea and installed at the seabed together with the pipeline termination skid, whereupon the arrangement may be released from the pipeline termination skid in order to allow a retrieval of the arrangement and a laydown head to a surface vessel.

According to another embodiment of the invention, the arrangement comprises a holder, more particularly in the form of a tray, for receiving and supporting a clamp connector after the release of the clamp connector from the joint between the laydown head and the pipeline end section, the holder being provided on the base frame and configured to be capable of receiving the clamp connector by a lowering of the clamp connector vertically downwards into the holder. Hereby, the clamp connector used for securing the laydown head to the pipeline end section may be brought into engagement with the holder after the release of the clamp connector from the joint between the laydown head and the pipeline end section to thereby allow the clamp connector to be retrieved to a surface vessel together with the arrangement and the laydown head.

Further more particular features of the laydown head retrieval arrangement of embodiments of the present invention will appear from the following description and the claims.

Embodiments of the invention also relates to a system comprising a pipeline termination skid and the abovementioned laydown head retrieval arrangement, wherein the system also comprises an operating tool which is detachably mountable to the pipeline termination skid and the arrangement when the arrangement is mounted to the pipeline termination skid, the operating tool being provided with one or more force applying members for displacing the base frame of the arrangement in relation to the pipeline termination skid in the longitudinal direction to thereby move a laydown head received on the seat or seats of each supporting unit away from the associated pipeline end section.

Embodiments of the present invention also relate to a method for retrieving a laydown head to a surface vessel from a pipeline end section that is secured to a pipeline termination skid at the seabed.

BRIEF DESCRIPTION OF THE DRAWINGS

With reference to the appended drawings, a specific description of embodiments of the invention cited as examples follows below. In the drawings.

DETAILED DESCRIPTION

Figure 1:
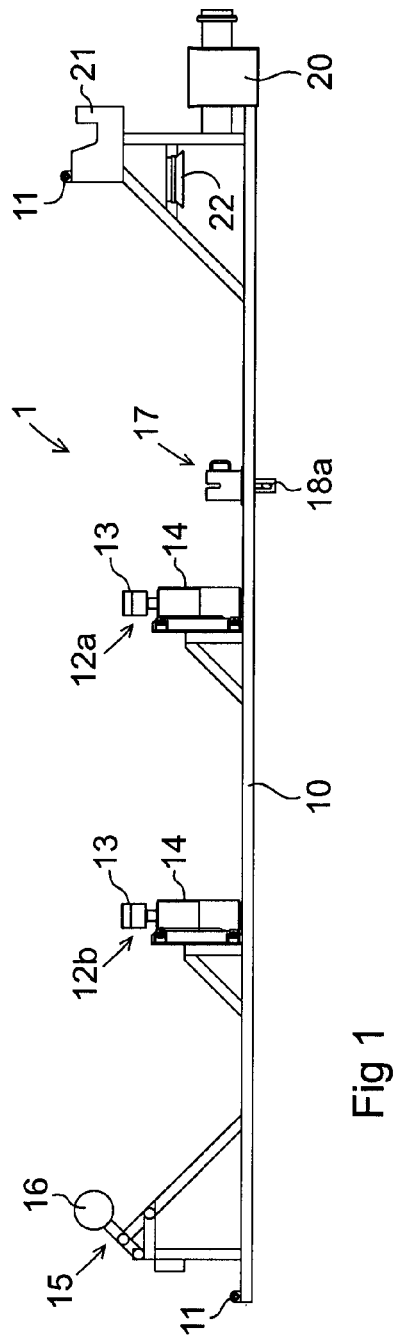
FIG. 1 is a schematic lateral view of an arrangement according to an embodiment of the present invention.
Figure 2:
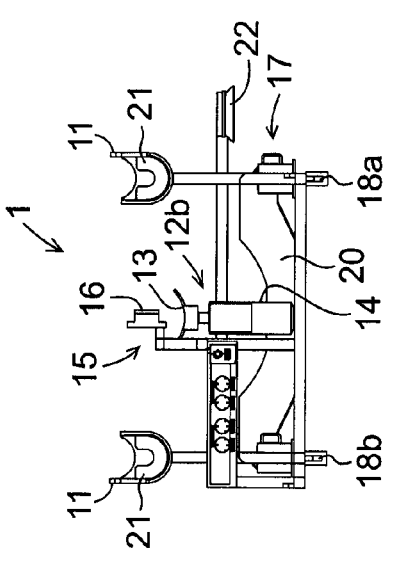
FIG. 2 is a schematic rear view of the arrangement of FIG. 1.
Figure 3:
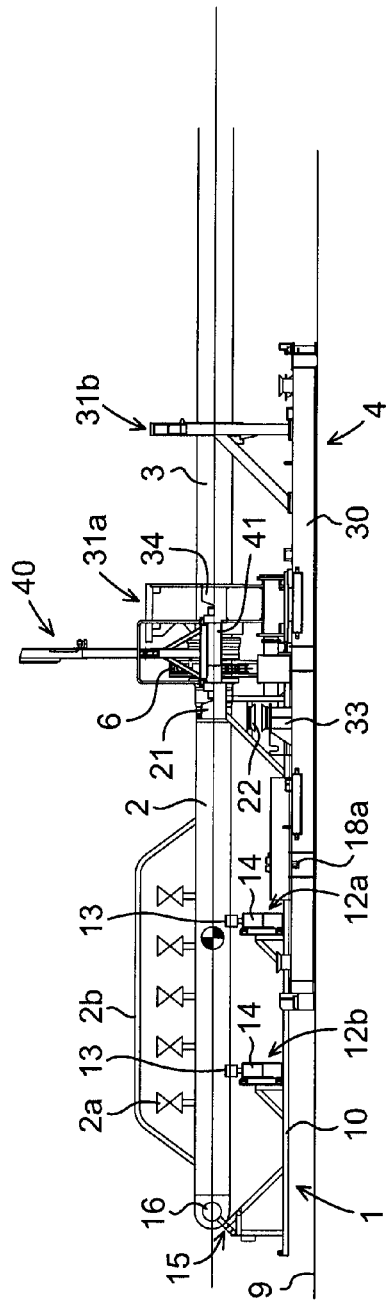
FIG. 3 is a schematic lateral view of the arrangement of FIG. 1 mounted to a pipeline termination skid.
Figure 4:
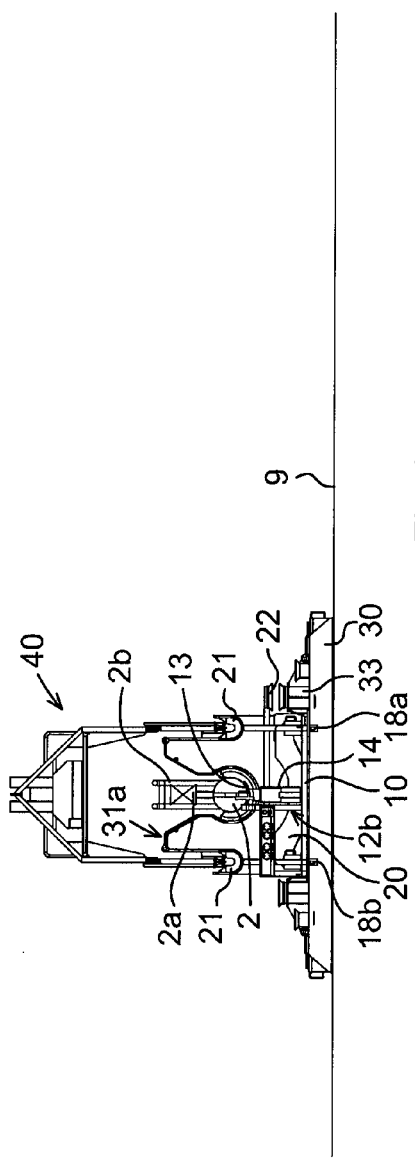
FIG. 4 is a schematic rear view of the arrangement and pipeline termination skid of FIG. 3, and FIGS. 5, 6, 7, 8, 9, 10, 11, 12 and 13 are schematic illustrations of the arrangement and pipeline termination skid of FIGS. 3 and 4, as seen at different stages during the process of connecting a pipeline end section to the pipeline termination skid and retrieving a laydown head.

An arrangement 1 according to an embodiment of the present invention is shown in FIGS. 1-4. The arrangement 1 is intended to be used for retrieving a tubular laydown head 2 to a surface vessel from a pipeline end section 3 that is secured to a pipeline termination skid 4 at the seabed. The arrangement 1 is detachably mountable to the pipeline termination skid 4 and comprises a base frame 10 configured to bear against the pipeline termination skid 4 when the arrangement 1 is mounted to the pipeline termination skid, as illustrated in FIGS. 3 and 4. The base frame 10 is mobile in order to allow the entire arrangement 1 to be lifted and moved. Lifting lugs 11 are provided on the base frame 10. Lifting wires are attachable to the lifting lugs 11 so as to allow the base frame 10 and the rest of the arrangement 1 to be lifted through the lifting wires. The base frame 10 is designed as a framework construction, as illustrated in FIGS. 1 and 2.

At least one rigid supporting unit 12*a*, 12*b* is provided on the base frame 10 for supporting the laydown head 2 from below. In the illustrated embodiment, the arrangement 1 is provided with two such supporting units 12*a*, 12*b*. The supporting units 12*a*, 12*b* are fixed to and supported by the base frame 10. Each supporting unit 12*a*, 12*b* comprises an upwardly directed seat 13 for receiving the laydown head 2 and a remotely operated actuating device 14, by means of which the seat 13 is moveable in relation to the base frame 10 in the vertical direction. The seat 13 is curved so as to conform to the outer surface of the laydown head 2. The supporting units 12*a*, 12*b* are arranged on the upper side of the base frame 10 behind each other in such a way that their seats 13 are mutually aligned, i.e. in such a way that the centre axes of the seats are coinciding, so as to allow a laydown head 2 to extend rectilinearly through the seats 13 of both supporting units 12*a*, 12*b*. The actuating devices 14 are configured to transfer the load of a laydown head 2 resting on the seats 13 of the supporting units 12*a*, 12*b* to the base frame 10. Thus, the laydown head 2 may be supported and carried by the base frame 10 through the supporting units 12*a*, 12*b*. In an embodiment, the actuating devices 14 are hydraulically actuated. In such a case, each actuating device 14 may consist of a hydraulic cylinder having a cylinder part fixed to the base frame 10 and a piston rod fixed to the seat 13 of the supporting unit. Hydraulic fluid for operating the hydraulic cylinder of each actuating device 14 may be supplied to the actuating devices from an ROV. As an alternative, each actuating device 14 may consist of a mechanically actuated drive screw mechanism.

The arrangement 1 comprises a locking device 15 provided on the base frame 10 for securing the laydown head 2 to the arrangement 1 in a fixed position when the seats 13 of the supporting units 12a, 12b are in contact with the laydown head. This locking device 15 is very schematically illustrated in FIGS. 1-4. The locking device 15 comprises a locking member 16, which is moveably mounted to the base frame 10 so as to be moveable from an unlocking position, in which the locking member 16 is not in locking engagement with the laydown head 2, to a locking position, in which the locking member 16 is in locking engagement with the laydown head 2 and keeps the laydown head 2 secured to the base frame 10 and the supporting units 12a, 12b. In the illustrated embodiment, the locking member 16 is configured for engagement with a pull eye 5 (see FIG. 6) provided at the outer free end of the laydown head 2. The locking member 16 may be movable from the unlocking position to the locking position by means of a remotely operated actuating device (not shown) provided on the base frame 10 or by means of an ROV operated tool.

The arrangement 1 comprises another locking device 17 provided on the base frame 10 for securing the base frame 10 to the pipeline termination skid 4. This locking device 17 comprises at least one locking member 18a, 18b which is moveably mounted to the base frame 10 so as to be moveable between a locking position, in which the base frame 10 is secured to the pipeline termination skid 4 in a fixed position, and an unlocking position, in which the base frame 10 is longitudinally slidable in relation to the pipeline termination skid 4 and vertically liftable away from the pipeline termination skid. In the illustrated embodiment, the locking device 17 comprises two locking members 18a, 18b provided on opposite sides of the centre axis of the base frame 10, as illustrated in FIG. 2. In the illustrated embodiment, each locking member 18a, 18b is rotatably mounted to the base frame 10 and provided with an external thread designed for detachable engagement with an internal thread of a corresponding locking member provided on the pipeline termination skid 4. Each locking member 18a, 18b is rotatable out of engagement with the corresponding locking member on the pipeline termination skid 4 by means of a torque tool (not shown), which is detachably connectable to the locking member 18a, 18b and operated by means of an ROV.

The laydown head 2 is secured to the pipeline end section 3 by means of a clamp connector 6. The arrangement 1 comprises a holder 20 for receiving and supporting the clamp connector 6 after the release of the clamp connector from the joint between the laydown head 2 and the pipeline end section 3. The holder 20 is fixed to and supported by the base frame 10 and configured to be capable of receiving the clamp connector 6 by a lowering of the clamp connector vertically downwards into the holder. In the illustrated embodiment, the holder 20 has the form of a tray with an upwardly directed opening, through which the clamp connector 6 may be lowered downwards into the tray. The holder 20 is mounted to the base frame 10 in such a position that the holder is located directly below the clamp connector 6 when the base frame 10 is secured to the pipeline termination skid 4 by means of the above-mentioned locking device 17.

The pipeline termination skid 4 illustrated in FIGS. 3-13 is of the type disclosed in WO 2006/005994 A1 and is intended for use in subsea connection of a pipeline to a spool piece. The termination skid 4 is to be secured to a pipeline end section 3 so as to support a pipeline hub 7 (see FIGS. 10-13) during the connection of the pipeline hub to a corresponding spool piece hub. The termination skid 4 comprises a base frame 30 for supporting the termination skid against the seabed 9 or a seabed-based foundation. Thus, the termination skid 4 may be placed on the seabed 9 or seabed-based foundation with the base frame 30 resting on the seabed or foundation. The base frame 30 is mobile in order to allow the entire termination skid 4 to be moved along the seabed 9 or seabed-based foundation. The illustrated termination skid 4 comprises two holding units 31a, 31b for securing the pipeline end section 3 and the associated pipeline hub 7 to the termination skid in a predetermined orientation in relation to the termination skid. The holding units 31a, 31b are fixed to and supported by the base frame 30. Each holding unit 31a, 31b is provided with an upwardly directed pipeline receiving seat having an upwardly directed entrance opening. The pipeline end section 3 is insertable subsea through the entrance opening of each pipeline receiving seat by being lowered vertically downwards through the entrance opening. The holding units 31a, 31b are arranged behind each other in such a way that their seats are mutually aligned, i.e. in such a way that the centre axes of the seats are coinciding, so as to allow a pipeline end section 3 to extend rectilinearly through the seats of both holding units 31a, 31b. Each holding unit 31a, 31b may be provided with a locking device for securing the pipeline end section 3 to the holding unit in contact with the seat of the holding unit. The foremost holding unit 31a is designed to be engageable with a shoulder 8 on the pipeline end section 3 by displacement of the pipeline termination skid 4 in the longitudinal direction of the pipeline end section so as to thereby fix the pipeline end section 3 axially in relation to the holding units 31a, 31b and thereby in relation to the base frame 30 of the pipeline termination skid 4. The base frame 30 is provided with a pull eye or the similar to allow the termination skid 4 to be displaced by pulling when installed on the seabed 9 or seabed-based foundation, and a number of lifting lugs to be used when lowering the termination skid 4 to the seabed or seabed-based foundation.

A ring-shaped guide member 22 is mounted to the base frame 10 of the arrangement 1 so as to project in a horizontal direction therefrom. This guide member 22 is configured to engage with a guide member in the form of a vertically extending guide post 32 (see FIG. 12), which is detachably mountable to the base frame 30 of the pipeline termination skid 4. A holding member 33 for holding and supporting the lower end section of the guide post 32 is provided on the base frame 30 of the pipeline termination skid 4.

As explained above, the arrangement 1 is displaceable in relation to the pipeline termination skid 4 when the locking members 18a, 18b have been moved to the unlocking position. In the illustrated example, the arrangement 1 is longitudinally displaceable in relation to the pipeline termination skid 4 by means of an operating tool 40, which is detachably mountable to the pipeline termination skid 4 and the arrangement 1 and operated by means of an ROV. The operating tool 40 is provided with at least one force applying member 41 for displacing the base frame 10 of the arrangement 1 in relation to the base frame 30 of the pipeline termination skid 4 in the longitudinal direction to thereby move a laydown head 2 received on the seats 13 of the supporting units 12a, 12b away from the pipeline end section 3. In the illustrated example, the operating tool 40 comprises two such force applying members 41 which are located on either side of the centre line of the laydown head 2 and the pipeline end section 3 when the operating tool 40 is mounted to the arrangement 1 and the pipeline termination skid 4. Each force applying member 41 may be a hydraulic cylinder, which at one end is detachably securable to a fastening member 21 that is rigidly connected to the base frame 10 of the arrangement 1 and at its other end is detachably securable to a fastening member 34 that is rigidly connected to the base frame 30 of the pipeline termination skid 4.

Figure 5:
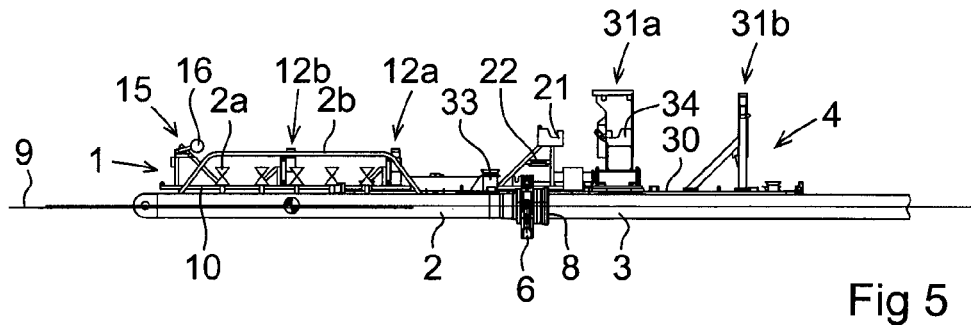
Figure 6:
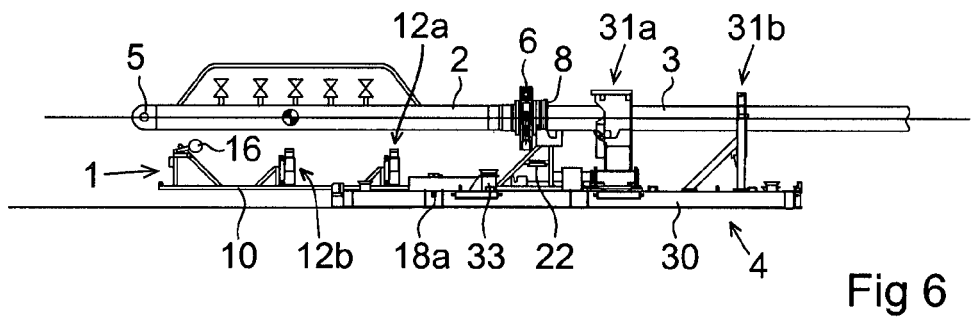
Figure 7:
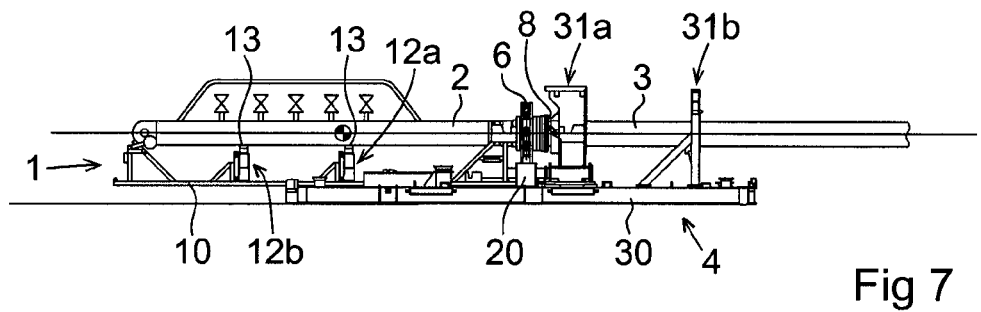

Different stages in a process of connecting the pipeline termination skid 4 to a pipeline end section 3 provided with a laydown head 2 are illustrated in FIGS. 5-7, whereas different stages in a subsequent process of retrieving the laydown head 2 to a surface vessel by means of an arrangement 1 according to an embodiment of the present invention are illustrated in FIGS. 8-13. In the illustrated example, the arrangement 1 is used for retrieving a laydown head 2 provided with valves 2a and a protection frame 2b for protecting the valves. However, the arrangement 1 may also be used for retrieving a laydown head lacking such valves and such a protection frame.

At first, the arrangement 1 is mounted to a pipeline termination skid 4 and secured in a fixed position in relation to the pipeline termination skid 4 by means of the above-mentioned locking members 18a, 18b.

Thereafter, the arrangement 1 and the termination skid 4 are together lowered into the sea, e.g. from a surface vessel, and placed on the seabed 9 or a seabed-based foundation adjacent to a pipeline end section 3 and an associated laydown head 2 which are laying on the seabed 9 or foundation and connected to each other by means of a clamp connector 6, as illustrated in FIG. 5.

The pipeline end section 3 and the laydown head 2 are then lifted and moved laterally to a position with the pipeline end section 3 located vertically above the holding units 31a, 31b of the pipeline termination skid 4 and with the laydown head 2 located vertically above the supporting units 12a, 12b of the arrangement 1, whereupon the pipeline end section 3 and the laydown head 2 are lowered downwards until the pipeline end section 3 makes contact with the seats of the holding units 31a, 31b, as illustrated in FIG. 6. During the landing of the pipeline end section 3 onto the pipeline termination skid 4, the seats 13 of the supporting units 12a, 12b are in a lowered position and the laydown head 2 will end up in a position vertically above these seats 13.

In order to fix the pipeline end section 3 axially in relation to the termination skid 4 in a predetermined position, the termination skid is displaced along the pipeline end section 3, for instance by being pulled, from the position illustrated in FIG. 6 to the position illustrated in FIG. 7 so that the foremost holding unit 31a is engaged with the shoulder 8 on the pipeline end section 3. The pipeline end section 3 may then be secured to the pipeline termination skid 4 by means of a suitable locking device.

Figure 8:
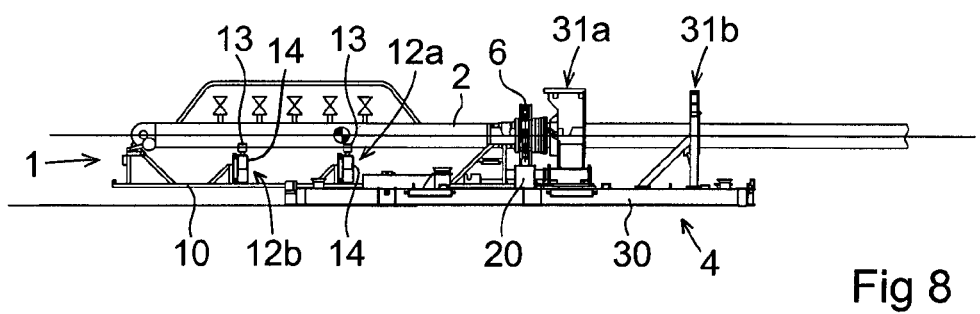

When the laydown head 2 thereafter is to be disconnected from the pipeline end section 3 and retrieved to a surface vessel, the actuating devices 14 of the supporting units 12a, 12b are actuated so as to move the seats 13 of the supporting units upwards into contact with the laydown head 2 in such a manner that the laydown head 2 will rest on the seats 13 and the load of the laydown head 2 will be transferred to the base frame 10 of the arrangement 1 through the actuating devices 14, as illustrated in FIG. 8. Thus, the laydown head 2 is now supported by the base frame 10 through the supporting units 12a, 12b.

Figure 9:
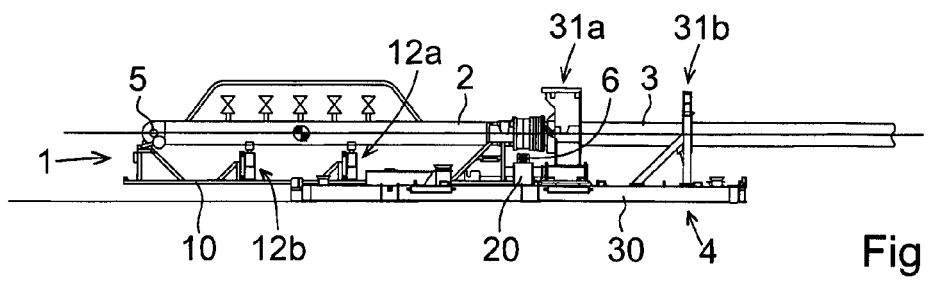

In the next step, the clamp connector 6 is opened by means of an ROV operated tool (not shown) so as to be disconnected from the pipeline end section 3 and the laydown head 2, whereupon the laydown head 2 is lowered downwards into the holder 20, as illustrated in FIG. 9.

Figure 10:
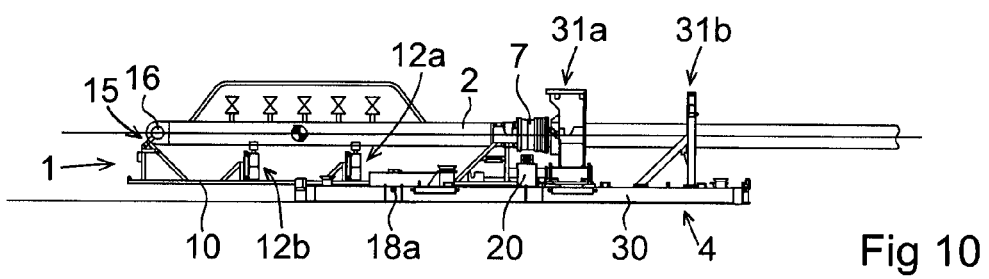

Thereafter, the above-mentioned locking member 16 is moved into the locking position, as illustrated in FIG. 10, so as to come into engagement with the laydown head 2 and prevent an axial displacement of the laydown head in relation to the base frame 10 and the supporting units 12a, 12b.

Figure 11:
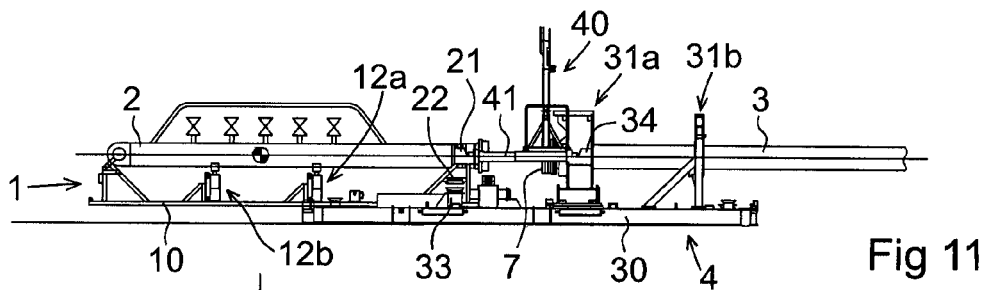

The above-mentioned operating tool 40 is then mounted to the pipeline termination skid 4 and the arrangement 1, whereupon the force applying members 41 of the operating tool 40 are actuated in order to displace the base frame 10 of the arrangement 1 in relation to the base frame 30 of the pipeline termination skid 4 in the longitudinal direction to thereby move the laydown head 2 away from the pipeline end section 3, as illustrated in FIG. 11. During this displacement, the base frame 10 of the arrangement 1 slides on the base frame 30 of the pipeline termination skid 4. The operating tool 40 is then retrieved to the surface vessel.

Figure 12:
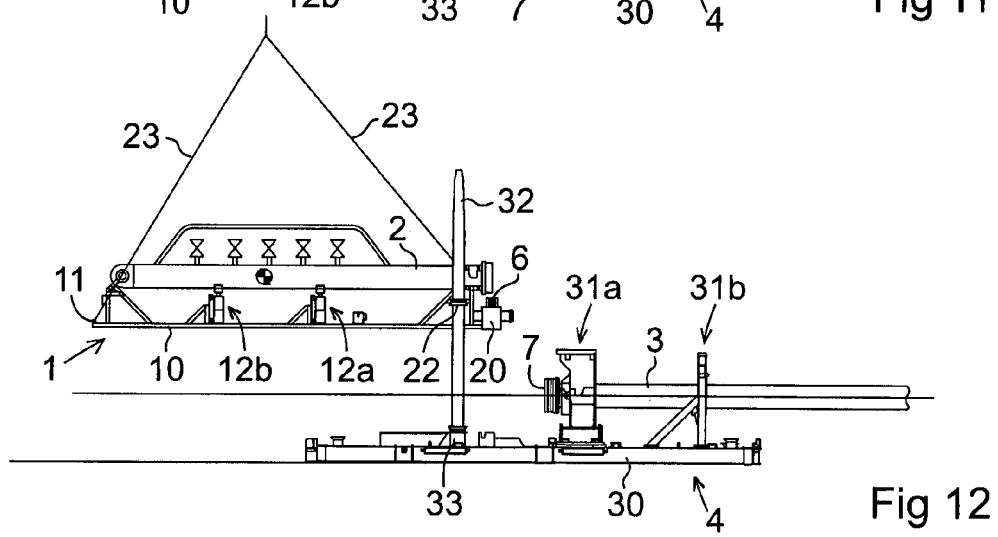
Figure 13:
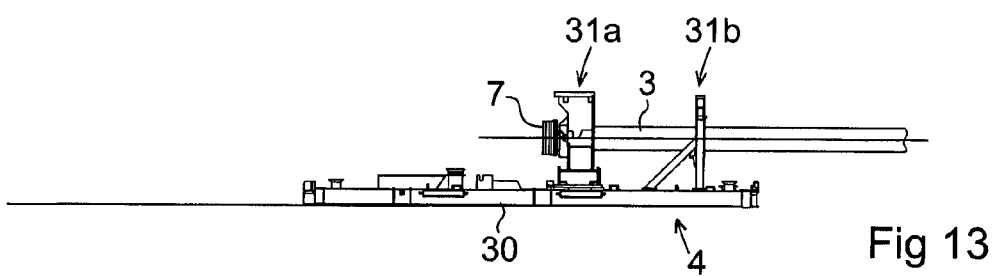

In the next step, a guide post 32 is lowered from the surface vessel into engagement with the guide member 22 and the holding member 33. Lifting wires 23 are then attached to the lifting lugs 11 on the base frame 10 of the arrangement 1, whereupon the arrangement 1, the laydown head 2 and the clamp connector 6 are lifted vertically upwards away from the pipeline termination skid 4 and up to the surface vessel through the lifting wires 23. During the first phase of this lifting movement, the arrangement 1 is guided in a controlled manner along the guide post 32 by means of the guide member 22, as illustrated in FIG. 12, and thereby prevented from swinging towards and hitting the pipeline hub 7 and the foremost holding unit 31a of the pipeline termination skid 4.

Finally, the guide post 32 is disconnected from the holding member 33 and retrieved to the surface vessel.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims

What is claimed is:

1. An arrangement for retrieving a laydown head to a surface vessel from a pipeline end section that is secured to a pipeline termination skid at a seabed, the arrangement comprising:
   a base frame;
   one or more rigid supporting units, and
   a locking device provided on the base frame for securing the base frame to the pipeline termination skid, the locking device comprising at least one locking member which is moveably mounted to the base frame so as to be moveable between a locking position, in which the base frame is secured to the pipeline termination skid in a fixed position, and an unlocking position, in which the base frame is longitudinally slidable in relation to the pipeline termination skid and vertically liftable away from the pipeline termination skid, wherein the arrangement is detachably mountable to the pipeline termination skid and the base frame is configured to bear against the pipeline termination skid when the arrangement is mounted to the pipeline termination skid, and wherein the one or more rigid supporting units are provided on the base frame for supporting the laydown head from below, each supporting unit comprising at least one upwardly directed seat for receiving the laydown head and an actuating device, by which the at least one upwardly directed seat is moveable in relation to the base frame in the vertical direction.

2. The arrangement according to claim 1, wherein the actuating device is configured to transfer a load of the laydown head resting on the at least one upwardly directed seat of each supporting unit to the base frame.

3. The arrangement according to claim 2, wherein the actuating device is hydraulically actuated.

4. The arrangement according to claim 2, wherein the actuating device is a mechanically actuated drive screw mechanism.

5. The arrangement according to claim 1, wherein the actuating device is hydraulically actuated.

6. The arrangement according to claim 5, wherein the actuating device is a hydraulic cylinder.

7. The arrangement according to claim 1, wherein the actuating device is a mechanically actuated drive screw mechanism.

8. The arrangement according to claim 1, wherein the arrangement is provided with at least two supporting units with upwardly directed seats that mutually align.

9. The arrangement according to claim 1, wherein the arrangement comprises another locking device for securing the laydown head to the arrangement in a fixed position when the at least one upwardly directed seat of each supporting unit is in contact with the laydown head.

10. The arrangement according to claim 1, wherein the arrangement comprises a holder for receiving and supporting a clamp connector after the release of the clamp connector from a joint between the laydown head and the pipeline end section, the holder being provided on the base frame and configured to be capable of receiving the clamp connector by a lowering of the clamp connector vertically downwards into the holder.

11. The arrangement according to claim 10, wherein the holder comprises a tray.

12. A system comprising:
a pipeline termination skid and a laydown head retrieval arrangement comprising a base frame, and one or more rigid supporting units, wherein the arrangement is detachably mountable to the pipeline termination skid and the base frame is configured to bear against the pipeline termination skid when the arrangement is mounted to the pipeline termination skid, wherein the one or more rigid supporting units are provided on the base frame for supporting the laydown head from below, each supporting unit comprising at least one upwardly directed seat for receiving the laydown head and an actuating device, by which the at least one upwardly directed seat is moveable in relation to the base frame in a vertical direction, and wherein the system also comprises an operating tool which is detachably mountable to the pipeline termination skid and the arrangement when the arrangement is mounted to the pipeline termination skid, the operating tool being provided with one or more force applying members for displacing the base frame of the arrangement in relation to the pipeline termination skid in a longitudinal direction tot move the laydown head received on the at least one upwardly directed seat of each supporting unit away from the associated pipeline end section.

13. The system according to claim 12, wherein each force applying member is a hydraulic cylinder.

14. The system according to claim 12, wherein the actuating device is configured to transfer a load of the laydown head resting on the at least one upwardly directed seat of each supporting unit to the base frame.

15. The system according to claim 12, wherein the actuating device is hydraulically actuated.

16. The system according to claim 12, wherein the actuating device is a mechanically actuated drive screw mechanism.

17. A method for retrieving a laydown head to a surface vessel from a pipeline end section that is secured to a pipeline termination skid at a seabed, the method comprising:
mounting an arrangement to the pipeline termination skid, wherein the arrangement comprising a base frame and one or more rigid supporting units, wherein the arrangement is detachably mountable to the pipeline termination skid and the base frame is configured to bear against the pipeline termination skid when the arrangement is mounted to the pipeline termination skid, and wherein the one or more rigid supporting units are provided on the base frame for supporting the laydown head from below, each supporting unit comprising at least one upwardly directed seat for receiving the laydown head and an actuating device, by which the at least one upwardly directed seat is moveable in relation to the base frame in a vertical direction;
securing the pipeline end section to the pipeline termination skid with the laydown head positioned above the at least one upwardly directed seat of each supporting unit;
moving the at least one upwardly directed seat of each supporting unit in the vertical direction upwards using the actuating device of the respective supporting unit so as to bring each upwardly directed seat into contact with the laydown head;
releasing the laydown head from the pipeline end section;
displacing the base frame of the arrangement in relation to the pipeline termination skid in a longitudinal direction to move the laydown head away from the pipeline end section; and
lifting the arrangement together with the laydown head away from the pipeline termination skid and up to the surface vessel.

18. The method according claim 17, wherein the actuating device is configured to transfer a load of the laydown head resting on the at least one upwardly directed seat of each supporting unit to the base frame.

19. The method according to claim 17, wherein the actuating device is hydraulically actuated.

* * * * *